US 6,890,041 B1

(12) United States Patent
Ribbens et al.

(10) Patent No.: US 6,890,041 B1
(45) Date of Patent: May 10, 2005

(54) ANTILOCK BRAKE SYSTEMS EMPLOYING A SLIDING MODE OBSERVER BASED ESTIMATION OF DIFFERENTIAL WHEEL TORQUE

(76) Inventors: William B. Ribbens, 4889 Greenook Ct., Ann Arbor, MI (US) 48103; Ronald J. Fredricks, 2046 Foxboro NW., Grand Rapids, MI (US) 49504

(*) Notice: Subject to any disclaimer, the term of this patent is extended or adjusted under 35 U.S.C. 154(b) by 93 days.

(21) Appl. No.: 10/068,270

(22) Filed: Feb. 6, 2002

Related U.S. Application Data
(60) Provisional application No. 60/266,701, filed on Feb. 6, 2001.

(51) Int. Cl.$^7$ .................................................. B60T 8/86
(52) U.S. Cl. .................. 303/126; 303/147; 303/148; 303/149; 303/150; 303/153; 303/154; 303/167; 303/188; 303/112; 303/20
(58) Field of Search ..................... 303/125, 126, 303/144, 147, 148, 149, 150, 151, 153, 154, 155, 167, 168, 172, 175, 182, 194, 112, 20

(56) References Cited

U.S. PATENT DOCUMENTS

| | | | |
|---|---|---|---|
| 4,715,662 A | 12/1987 | van Zanten et al. | 303/109 |
| 4,828,334 A * | 5/1989 | Salman | 303/191 |
| 5,409,302 A * | 4/1995 | Chabbert | 303/112 |
| 5,515,279 A * | 5/1996 | Hrovat et al. | 701/82 |
| 5,549,371 A * | 8/1996 | Konaga et al. | 303/152 |
| 5,564,796 A * | 10/1996 | Saito et al. | 303/112 |
| 5,918,951 A | 7/1999 | Rudd, III | 303/150 |
| 6,104,148 A * | 8/2000 | Kumar et al. | 318/52 |
| 6,122,585 A * | 9/2000 | Ono et al. | 701/71 |

(Continued)

OTHER PUBLICATIONS

Unsal et al., "Sliding Mode Measurement Feedback Control for Antilock Braking Systems" (IEEE Transactions on Control Theory, Mar. 1999, vol. 7, pp. 271–281).

Tanner et al., "Dynamics of Aircraft Antiskid Braking Systems", NASA Technical Paper 1959, 95 pages, Feb. 1982).

Akey, Mark L., "Development of fuzzy logic, ABS control for commercial trucks", Magnavox Decision Support Systems Applied Center of Excellence, Fort Wayne, IN SPIE vol. 2493, Mar. 1995, pp. 359–370.

Primary Examiner—Jack Lavinder
Assistant Examiner—Devon Kramer
(74) Attorney, Agent, or Firm—Joseph F. Breimayer

(57) ABSTRACT

Improved methods and systems for controlling hydraulically or electrically actuated anti-lock brake systems (ABS) on air and land vehicles requiring only measurement of wheel angular speed although brake torque measurements can also be employed if available. A sliding mode observer (SMO) based estimate of net or different wheel torque (road/tire torque minus applied brake torque) derived from the measured wheel speed is compared to a threshold differential wheel torque derived as a function of a "skid signal" also based on wheel speed only to generate a braking control signal. The braking control signal can be employed to rapidly and fully applying and releasing the brakes in a binary on-off manner and, as an additional option, possibly modulating the maximum available brake hydraulic pressure or electrical current when the brakes are in the "on" state in a continuous manner. In the case of the basic on-off component of braking, the brakes are released when the estimate of differential wheel torque is less than the threshold differential wheel torque (i.e. for relatively high values of brake torque), and the brakes are applied fully when the estimate of differential wheel torque is greater than or equal to the threshold differential wheel torque. For aircraft landing gear applications, a fore-aft accelerometer mounted on the landing gear can be used to suppress nonlinear gear displacement oscillations commonly called gear walk in the direction of wheel roll.

28 Claims, 4 Drawing Sheets

U.S. PATENT DOCUMENTS

| | | | |
|---|---|---|---|
| 6,122,588 A | * | 9/2000 | Shehan et al. .................. 701/93 |
| 6,266,600 B1 | * | 7/2001 | Miyazaki ..................... 701/71 |
| 6,270,172 B1 | * | 8/2001 | Shirai et al. ................. 303/152 |
| 6,293,632 B1 | * | 9/2001 | Grote et al. ................. 303/112 |
| 6,412,886 B1 | * | 7/2002 | Abe et al. .................... 303/139 |
| 2003/0052536 A1 | * | 3/2003 | Schneider et al. .......... 303/146 |
| 2003/0151302 A1 | * | 8/2003 | Anwar ....................... 303/112 |

* cited by examiner

US 6,890,041 B1

ANTILOCK BRAKE SYSTEMS EMPLOYING A SLIDING MODE OBSERVER BASED ESTIMATION OF DIFFERENTIAL WHEEL TORQUE

RELATED APPLICATIONS

This application claims priority to provisional U.S. application Ser. No. 60/266,701 filed Feb. 6, 2001, "METHOD FOR CONTROLLING ANTILOCK BRAKE-SYSTEMS ON AIRCRAFT AND LAND VEHICLES EMPLOYING A SLIDING MODE OBSERVER BASED ON ESTIMATION OF DIFFERENTIAL WHEEL TORQUE", William B. Ribbens and Ronald J. Fredricks.

FIELD OF THE INVENTION

The present invention pertains to anti-lock brake systems (ABS) employed on aircraft and land vehicles, and particularly to an improved ABS and method of operating same employing a sliding mode observer (SMO) incorporated into an ABS algorithm requiring only measurement of wheel angular speed, and optionally employing brake torque measurement if available.

BACKGROUND OF THE INVENTION

Brake systems, whether for aircraft or land vehicles, function by applying a retarding torque to the braked wheels of the vehicle that is in a direction opposite to the rotational direction of the wheel as the vehicle moves across a road or runway surface or any other surface (hereafter referred to as a "ground surface" regardless of actual surface type). The actual braking force that decelerates the vehicle is a function of wheel slip, i.e. the difference between the translational velocity of the vehicle (relative to the wheel axis) and the corresponding translational velocity of the wheel at the contact point with the ground surface. This braking force is directed opposite to the vehicle velocity vector and results from sliding friction between the tire and the ground surface, since the contact point is really a patch with a finite area.

For the purposes of this disclosure, we shall call the wheel rotation retarding torque that is created by the brake mechanism and applied brake torque, $T_a$. We shall further call the vehicle decelerating or braking force the drag force, $F_b$, and the related road/tire torque the drag torque, $T_b$. We further define a normalized, dimensionless, instantaneous wheel slip, S, defined as:

$$S=(V-\omega^*r)/V, \text{ where} \qquad (1)$$

V=translational vehicle velocity
ω=wheel angular speed
r=effective radius of the braked wheel in question Note, "wheel angular speed" is the same as "wheel angular velocity" in the context we use these terms in the following and does not means wheel linear speed which is wheel angular speed multiplied by wheel radius r ((ω*r in equation (1)). The simple term "wheel speed" will mean wheel angular speed or wheel angular velocity in the following. When wheel linear speed is meant, it will be explicitly stated as such. Strictly speaking, velocity is a vector and speed is a scalar, but that usage rule is violated all the time in publications and general conversation.

Translational vehicle velocity V may be regarded as a scalar in the above equation (1) since we will assume straight line braking with no wheel sideslip in the remainder of this discussion. However, this assumption is for ease in understanding the principle of operation of the SMO-based ABS described herein and in no way limits the applicability of the improved ABS and method of implementing it to straight line braking.

The wheel drag or "braking" force, $F_b$, is linearly proportional to the normal force, N, acting on the wheel and the frictional ground surface coefficient, $\mu(S)$. Thus, we may calculate:

$$F_b = N^*\mu(S) \qquad (2)$$

The corresponding wheel drag or "braking" torque, $T_b$, is obtained by multiplying $F_b$ by the effective wheel radius, r. However the friction coefficient $\mu$ varies with slip S in a typical manner as depicted in FIG. 1a. There is a value of slip S that results in a peak value for the friction coefficient $\mu$ for any given vehicle, tire, and ground surface condition. This optimum value of slip S for maximizing wheel surface friction will be denoted by optimal slip $S^*$ in the following.

The primary ABS goal is to regulate applied brake torque $T_a$ such that friction coefficient $\mu$ remains as close as possible to its peak value shown in FIG. 1A, thereby maximizing deceleration for a given applied brake torque $T_a$. ABS methods described in the prior art have generally involved instrumentation and/or computer algorithms for directly estimating the instantaneous slip S. It has been assumed in some of these methods that a single value for optimal (e.g. $S^*=0.13$) is representative of all ground surface conditions or is sufficiently close to the true optimal slip $S^*$ that the braking performance is acceptable although suboptimal. The ABS brake controller then simply regulates brake hydraulic pressure of a hydraulic braking system or electrical current applied to an electro-mechanical braking system so as to maintain an instantaneous slip value S.

For example, one prior art aircraft antilock brake systems evaluated by NASA Langley in the early 80's, described in NASA Technical Paper 1959 by John Tanner et al (dated February 1982), used an un-braked nose-wheel to obtain a vehicle velocity measurement and wheel angular speed ω from the braked wheels to compute an instantaneous slip value S by direct application of equation (1) assuming the un-braked nose wheel angular speed is the same as the vehicle velocity. The ABS controller compared the instantaneous slip value S to the assumed optimal slip $S^*$ and then modulated the brake pressure accordingly. Unfortunately, the nose wheel angular speed is only a very noisy measurement of the true aircraft velocity during the landing roll. There could be instances where the nose wheel has not fully touched down yet the ABS needs to be applied. Furthermore, the nose wheel could be worn or have low pressure so as to have a rounded radius.

In a more recent example, the sliding mode controller described by Unsal and Kachroo in "Sliding Mode Measurement Feedback Control for Antilock Braking Systems" (IEEE Transactions on Control Theory, March 1999, vol. 7, pp. 271–281), while based on braked wheel angular speed measurements, still assumed that the desired optimal slip, $S^*$, was a fixed value and known in advance. Furthermore, even though the words "sliding mode" appeared in the title, Unsal and Kachroo really implemented a sliding mode "controller", not a sliding mode "observer". A controller attempts to force a system state variable(s) to achieve or track a given desired value(s) and drives the error between the actual state variable(s) and desired value(s) to zero. An observer merely attempts to estimate a system state variable (s) as accurately as possible given measurements related to that state variable(s).

Unsal and Kachroo computed their instantaneous slip S dynamically by solving a differential equation for slip S based upon a non-linear observation of the vehicle state (vehicle speed and wheel angular speed) with wheel angular speed as the sole state measurement. Their sliding mode controller attempted to drive S to an assumed know optimal value S*. The fundamental problem with such approaches is that optimal slip S* is not really a known constant but rather varies from under 0.1 to over 0.20, dependent on ground surface conditions, although most often in the range 0.11 to 0.15 (thus partially justifying the frequently used value of S*=0.13 mentioned earlier). Furthermore, the $\mu$-S curve may vary dynamically during a given braking situation as ground surface conditions change and may even differ from one braked wheel to the next.

More sophisticated ABS methods attempt to estimate friction coefficient $\mu$ continuously and then control braking so as to dynamically track the actual peak of the $\mu$-S curve. An example disclosed in U.S. Pat. No. 5,918,951 by Rudd employs an 8-state Kalman filter to directly estimate friction coefficient $\mu$ using as inputs pilot brake pressure aircraft velocity, and aircraft acceleration in addition to wheel angular speed on each brake wheel and, optionally, wheel brake torque as well. The aircraft velocity and acceleration measurements are assumed to be obtained from the aircraft electronics (an inertial navigation system and/or air data system for example). However, the mathematical complexity associated with such a mathematical estimation procedure might limit the ability of the '951 patent method to function properly in real-time braking situations.

Even if an accurate measurement of both vehicle velocity and wheel angular speed is available so that the instantaneous slip S can be measured, the optimal slip S* associated with the peak $\mu$ is really unknown in advance of brake application and may even vary along the ground surface. Rudd attempts to actually estimate S* and then command a pressure to the brake actuator that will continuously drive instantaneous slip S to optimal slip S*, but his approach is very complex mathematically involving an 8-state Kalman filter solution that must be repeated many, many times per second. Furthermore, while wheel angular speed sensors are cheap, the velocity and acceleration sensors required by Rudd in his preferred embodiment are usually associated with expensive inertial or air data systems.

What is needed is a simple method and system that operates in real-time to improve braking and that does not require complex mathematical calculations that are difficult to perform in real-time and/or expensive on-board sensors.

SUMMARY OF THE INVENTION

We have realized that, since the underlying mathematical model for differential wheel torque $\Delta T$ is only partially known, a sliding mode observer or SMO would be the ideal mathematical tool for estimating the net or differential wheel torque $\Delta T$ using measurements of wheel speed only. We compare an SMO-based estimate of differential wheel torque $\Delta \hat{T}$ to a threshold differential wheel torque, $\Delta T_{threshold}$, and derive a braking control signal on/off brake control commands from the results of the comparison. When the vehicle brakes are applied by the operator, the braking control signal periodically interrupts the braking and optionally modulates the braking force during wheel lock-up depending on the results of the comparison of the estimate of differential wheel torque $\Delta T$ to a threshold differential wheel torque, $\Delta T_{threshold}$, so as to optimize wheel slip during braking. The SMO-based method of our invention is extremely simple to implement within an existing embedded ABS microprocessor or vehicle computer and employs currently available, inexpensive, on-board sensor inputs.

The SMO-based ABS method of our invention instantly self-adapts over a broad range of possible optimal slip S* values to provide near optimal braking in real time.

The sliding mode observer estimates the net or differential wheel torque $\Delta T$ which corresponds to drag torque $T_b$ less applied brake torque $T_a$ using only the measured wheel angular speed $\omega_{meas}$. With a good wheel sensor $\omega_{meas}$ is almost exactly the same as the (true) wheel angular speed $\omega$ appearing in equation (1). For simplicity in all the following discussion and mathematics we shall therefore drop the subscript "measured" and use the single symbol $\omega$ for both measured and true instantaneous wheel angular speed. However, we shall always indicate which is meant in the associated text. The SMO-based method of our invention is extremely simple to implement within an existing embedded ABS microprocessor or vehicle computer and employs currently available, inexpensive, on-board sensor inputs. The SMO-based ABS method of our invention instantly self-adapts over a broad range of possible optimal slip, S*, values to provide near optimal braking in real time.

In our invention employing an SMO to estimate differential wheel torque $\Delta T$, there normally is no need for a direct measure of applied brake torque $T_a$ in addition to wheel angular speed $\omega$. On the other hand, if an economically practical sensor were available for measuring applied brake torque $T_a$, then the braking drag torque $T_b$ could be directly estimated by simple mathematical addition of the estimated differential wheel torque $\Delta T$ from the SMO output and the measured applied brake torque $T_a$ ($T_b=\Delta T+T_a$). A control algorithm that regulated applied brake torque $T_a$ so as to continuously maximize braking drag torque $T_b$ would then correspond to operating exactly at the peak surface friction coefficient $\mu$, yielding optimum braking while still requiring no knowledge or measurement of the actual $\mu$ or of the shape of the $\mu$-S curve other than the assumption that it be unimodal.

The SMO-based estimation of the real, instantaneous, differential, or net, wheel torque $\Delta T$ (drag torque $T_b$ minus applied brake torque $T_a$) using only the measured angular wheel speed $\omega$ enables calculations of relevant ABS control variables including but not limited to those variables such as a brakes on/off command that rapidly and fully applies and releases the brakes in a binary manner when the on/off command is a binary value signifying "off" and, as an additional option, a maximum pressure limit or maximum current limit command that modulates the available hydraulic brake pressure or available electric brake current in a continuous manner from zero to the true maximum limit characteristic of the actual brake system involved.

In the case of on/off braking, a threshold differential wheel torque $\Delta T_{threshold}$ is continuously computed to compare with the estimated differential wheel torque $\Delta T$ (the "hat" stands for "estimated") output by the SMO. The threshold differential wheel torque $\Delta T_{threshold}$ is dynamically varied in accordance with the estimated differential wheel torque $\Delta T$ value and a separately calculated "skid-signal", SS, also based on wheel angular speed $\omega$ only, favoring brake release as the skid signal increases and brake application as the skid signal decreases. The brakes for each wheel being controlled are released when the estimated differential wheel torque $\Delta T$ falls below the threshold differential wheel torque $\Delta T_{threshold}$ (on/off command signifying, "off" or exhibiting "off-command"), and the brakes are applied fully (on/off command signifying "on" or exhibiting "on-command") when the estimated differential wheel torque $\Delta \hat{T}$ exceeds the threshold differential wheel torque $\Delta T_{threshold}$ in a limit cycle control system.

The SMO and associated brake controller are assumed to be implemented in a digital computer or programmable controller in any practical application. (Without loss of generality the term "digital computer or programmable controller" used in this disclosure and attached claims shall include embedded microprocessor, "digital controller" or any other means of implementing the SMO and associated brake controller involving digital signal processing.) Any analog inputs such as measured wheel-speed ω must therefore be converted to digital format by an analog to digital converter. Similarly the binary on/off command output from the controller to the brake actuator and, if also output, any commanded modulation of the maximum available hydraulic pressure or electric current for the brakes themselves must be converted from digital words to appropriate actuator control currents to drive the brake actuator by a digital to analog converter. This conversion to an electric current is required whether the brakes are hydraulic, employing an electro-hydraulic actuator (frequently referred to just as a hydraulic actuator for short), or the brakes are totally electric, employing an electro-mechanical actuator, which drives the brakes directly.

Moreover, for aircraft landing gear applications, a fore-aft accelerometer mounted on the gear, while not essential, can be used to suppress nonlinear gear displacement oscillations, commonly called "gear walk", in this same direction. The gear walk oscillation amplitude can be sufficiently damped to allow normal SMO-based ABS operation to continue in the manner described in reference to the first embodiment by properly summing a suitably phased and scaled version of the high pass filtered fore-aft accelerometer signal, after conversion to an equivalent gear walk oscillation damping current, with the normal electrical current assumed operating the brake actuator. The same technique for gear walk oscillation suppression can be applied whether the brake actuator is hydraulic or electro-mechanical corresponding to a hydraulic brake or an electric brake. In the case of land vehicles gear walk oscillation does not exist of course.

This summary of the invention has been presented here simply to point out some of the ways that the invention overcomes difficulties presented in the prior art and to distinguish the invention from the prior art and is not intended to operate in any manner as a limitation on the interpretation of claims that are presented initially in the patent application and that are ultimately granted. The various features of the invention described herein can be practiced alone or in combinations disclosed herein or later developed.

BRIEF DESCRIPTION OF THE DRAWINGS

Other advantages and features of the present invention will be readily appreciated as the same becomes better understood by reference to the following detailed description when considered in connection with the accompanying drawings, in which reference numerals designate like parts throughout the figures thereof and wherein.

DETAILED DESCRIPTION OF THE INVENTION

Use of a Sliding Mode Observer in an ABS: As summarized above, the present invention is based upon the use of an SMO for estimating the net or differential wheel torque $\Delta T$, namely the difference between the drag torque, $T_b$, and the applied brake torque, $T_a$, i.e., $\Delta T = T_b - T_a$. An SMO is a type of continuous state estimator well known by those skilled in the art of control systems for its excellent accuracy in estimating the state variables in a dynamic system. A dynamic system is characterized mathematically by a set of linear or non-linear differential equations relating the system states as they vary in time under the action of a, usually different, set of control variables, and given as a set of linear or non-linear measurements of these state variables. In many cases, however, the corresponding mathematical models are nonlinear and/or poorly known. Such is the situation for the braking systems of most aircraft and land vehicles.

It should be noted that the SMO output does not directly control the dynamic system or it would be called a sliding mode controller, not a sliding mode observer. Rather, a suitable controller must still be added which modulates the systems control variable(s) to achieve a given desired state estimate as seen by the SMO. Here the dynamic system is the vehicle itself and the control variables are the brake hydraulic-pressure or electric current, depending on the brake system employed. The observation model is the wheel angular speed sensor and, optionally, brake torque sensor and/or brake pedal position inputs and, in the case of aircraft braking, a fore-aft accelerometer on each landing gear.

Figure 2:
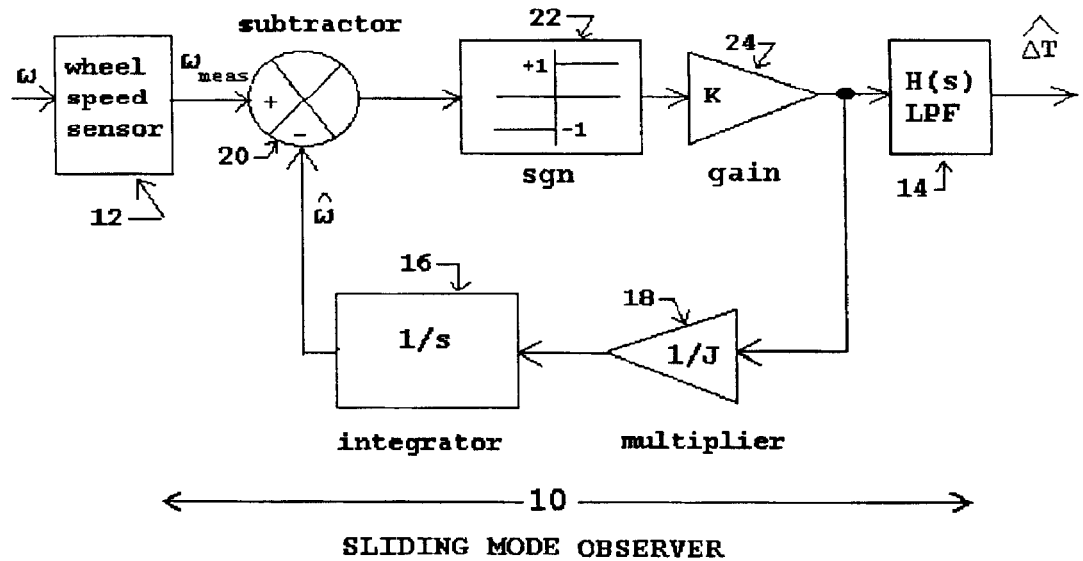
FIG. 2 is a system block diagram of an SMO employed in the SMO-based ABS of the present invention for developing estimated differential wheel torque $\Delta T$ from wheel speed ω.

A block diagram of an SMO 10 suitable for implementation as a computer algorithm in software is depicted in FIG. 2. The SMO 10 continuously estimates the wheel angular speed ω. We shall call this estimate ω̂ where the "hat" denotes an estimate. The rate of change of the wheel angular speed ω is, on the average, proportional to the differential wheel torque ΔT from basic dynamics. Thus, by low pass filtering (LPF) a signal proportional to the time derivative of the estimated wheel angular speed, i.e. proportional to $d/dt\{\hat{\omega}\}$ an estimate is obtained of the differential wheel torque ΔT, and the estimate itself is denoted with another "hat" i.e. as $\Delta\hat{T}$. Since the SMO is implemented in a digital computer or programmable controller, the low pass filter would also be implemented in software as a digital low pass filter.

Assuming a reasonably good differential wheel torque estimate $\Delta\hat{T}$, it is logical to infer that if the differential wheel torque estimate ΔT is too large algebraically at a given instant, there is rotatably insufficient braking since applied brake torque $T_a$ appears with the negative sign in the expression for differential wheel torque ΔT. It can therefore be expected that if that same insufficient braking is maintained the road/tire friction, i.e. wheel drag, torque $T_b$ will shortly start to fall, reducing braking efficiency. Alternately if the differential torque estimate $\Delta\hat{T}$ is too small algebraically the brakes are being applied too severely and a skid will likely develop. Thus it makes sense to control the brakes with an on/off command determined by comparing the differential wheel torque estimate $\Delta\hat{T}$ to a suitable threshold which decides whether the differential torque estimate $\Delta\hat{T}$ is too high or too low and anticipates either inefficient braking or a deep skid condition as approaching. A limit cycle will develop on the instantaneous slip S roughly centered on the optimal slip S* even though unknown. This is a heuristic explanation of the SMO and brake controller combination.

Referring in detail now to FIG. 2, the SMO 10 receives the measured wheel-angular speed ω from a conventional wheel speed sensor 12 of an ABS equipped brake assembly on each vehicle wheel. The measured wheel angular speed ω is combined with the SMO generated estimate of wheel speed $\hat{\omega}$ in subtraction block 20, and the resulting signal, $\omega-\hat{\omega}$, is processed in the Sign function block 22 as described further below. The output of the Sign function block 22 is passed through a gain stage 24 and then low pass filtered in LPF block 14 to provide the differential wheel torque estimate $\Delta\hat{T}$. The gain stage 24 controls the responsiveness of the SMO 10 to changes in wheel angular speed error and must be sufficiently greater than zero to guarantee stability of the SMO estimate for wheel angular speed $\hat{\omega}$. Typically, computer simulation is used to optimize this gain for a given vehicle ABS application. The output of the gain stage 24 is also passed through another gain multiplier stage 18 and a Laplace transform integrator stage 16 to provide the estimated wheel angular speed $\hat{\omega}$. Note that the "s" appearing in the integrator stage 16 is the Laplace frequency domain variable and is not to be confused with the slip S. These stages and blocks of the SMO 10 depicted in FIG. 2 are normally implemented in software assuming a suitable analog to digital converter is employed at the output of the wheel speed sensor 12 or the sensor output is already in a digital format.

The SMO function is based upon the simplified dynamic model for a brake wheel namely:

$$d/dt\{\omega\}=\Delta T/J \quad (3)$$

where

J=wheel moment of inertia (including all rotating parts such as the rim and tire) and d/dt denotes a time derivative.

The corresponding SMO differential equation for the estimate of wheel angular speed $\hat{\omega}$, assuming an accurate measurement of the true wheel angular speed ω by sensor 12 is given by:

$$d/dt\{\hat{\omega}\}=K*Sgn(\omega_{meas}-\hat{\omega})\approx K*Sgn(\omega-\hat{\omega}) \quad (4)$$

where Sgn is the so called Sign function block 22 and the measured wheel angular speed $\omega_{meas}$ is almost always very close to the (true) wheel angular speed ω as noted earlier. Strictly speaking, the Sgn function is undefined when its argument is zero. However to avoid numerical difficulties such as chattering behavior when performing the integration in integrator stage 16, one may assign a value of +1 or −1 to the Sgn output based on a random "coin toss" whenever ω and $\hat{\omega}$ are within some suitably close distance of each other. The Sgn function can be replaced by a so-called Saturation function, which has a very small linear region around the switch point at zero argument. This and other ways to get around possible switch point instability problems are well known to those versed in SMO theory.

The low pass filter 14 in the block diagram of SMO 10 outputs the estimate of differential wheel torque $\Delta\hat{T}$. While many choices are available for the design of the low pass filter 14, the smoothing it affords is usually quite useful in order to avoid excessive brake activity in an SMO-based ABS. Typically, a first order filter design is sufficient, where the low pass filter transfer function H(s) is given by:

$$H(s)=a/(s+a); \quad (5)$$

where a=the filter bandwidth; and s=the complex, Laplace, frequency variable.

As already noted, although an SMO can estimate state vectors with multiple state variables, the present invention incorporates such SMO 10 processing a single state variable, namely angular wheel speed ω, and providing a single output variable for each wheel, namely an estimate of differential wheel torque $\Delta\hat{T}$. However, additional inputs besides angular wheel speed ω can be used in an SMO-based ABS in accordance with our invention to further improve performance as described in the following embodiments. These secondary inputs include measurements of the driver's or pilot's brake pedal input deflection or pedal force denoted by $F_{input}$ and/or the applied brake torque $T_a$ in those situations where an electric brake is employed and torque sensing can be accomplished economically.

Furthermore, in the case of aircraft braking, the well-known gear walk phenomena, associated with longitudinal oscillation of the landing gear itself, can present false indications of over-braking or under-braking to the brake on/off controller. The ABS on/off cycling can aggravate the gear walk oscillations under certain braking conditions leading to degraded braking performance and/or damage to the aircraft landing gear/strut assembly. In this case, the addition of a low cost, fore-aft accelerometer on each sprung gear mass can be used to achieve a signal that can be fed back to the actuator input, after suitable high pass filtering and phase and amplitude compensation, along with the normal SMO controlled braking signal to suppress gear walk oscillations to an acceptable (low) level. However, we shall defer the cases with multiple measurement inputs to the ABS until later in this discussion. The first two preferred embodiments of the present invention assume only a single input measurement namely angular wheel speed ω for each braked wheel. The remaining embodiments add measurements from other sensors to improve ABS performance. An ABS controller generated estimate of differential wheel torque $\Delta\hat{T}$ output from the sliding mode observer 10 using wheel angular speed ω as measured by a wheel speed sensor (ω) is employed in each embodiment.

Figure 3:
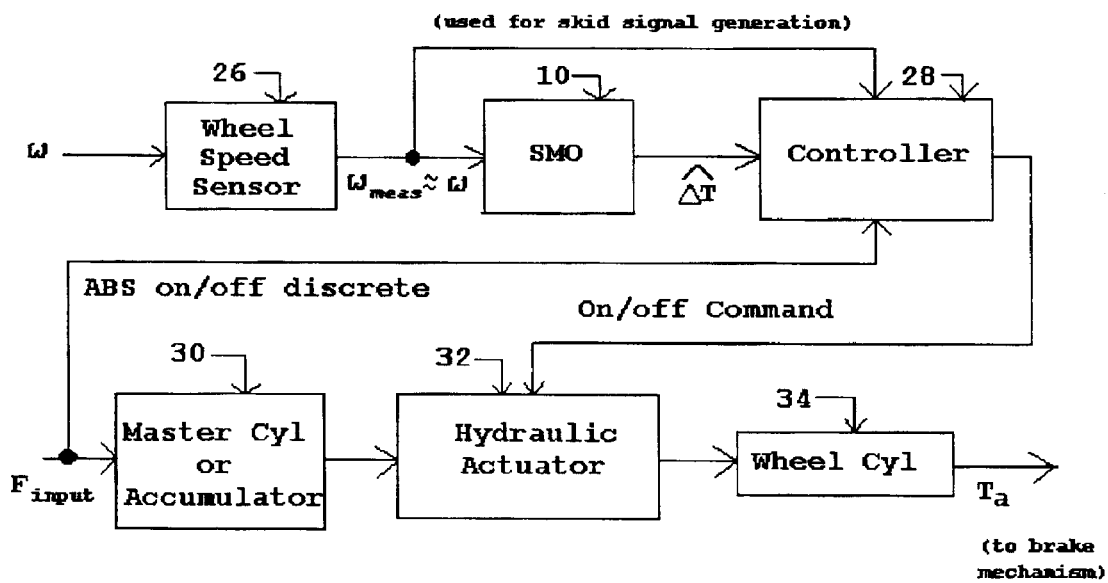
FIG. 3 is a system block diagram of a first preferred embodiment of an SMO-based ABS of the invention using the SMO of FIG. 2 to generate on/off commands in an ABS brake controller based on comparison of the estimated differential wheel torque $\Delta T$ to a calculated threshold differential wheel torque $\Delta T$ and applying on/off commands from an ABS brake controller to a hydraulic actuator.

First Preferred Embodiment: A first preferred embodiment of the SMO-based ABS implemented in a hydraulic braking system using SMO-based estimates of differential wheel torque $\Delta\hat{T}$ is depicted in FIG. 3. The brakes are controlled hydraulically via a conventional hydraulic actuator 32 which in turn provides pressurized hydraulic fluid to the wheel cylinder 34 when the vehicle operator applies the input force $F_{input}$. In this embodiment, any substantial pedal input deflection or hard braking force, $F_{input}$, that is applied by the vehicle operator AS through the brake pedal to a master cylinder (automotive application) or a pressure accumulator (transport aircraft application) 30 serves as a discrete command to the controller 28 to enable SMO based ABS operation. For simplicity of description, the master cylinder and pressure accumulator are interchangeable referred to as "master cylinder" 30 at times herein, but it shall be understood to represent a pressure accumulator in aircraft applications. While not explicitly shown in FIG. 3, there may be an additional pressure-metering valve associated with the output of the master cylinder 30 that modulates the output pressure in accord with the brake pedal input by mechanical linkages.

When the ABS controller 28 is not active, the resultant output hydraulic pressure from the master cylinder 30 is transmitted through the hydraulic actuator 32 in direct proportion to the input force $F_{input}$ and without further attenuation to a wheel cylinder 34. The latter produces the applied brake torque $T_a$, typically by a mechanical brake mechanism coupled to and moved by the piston of the wheel cylinder 34. When the ABS controller 28 is active, the hydraulic actuator 32 functions to abruptly reduce the applied hydraulic pressure to the wheel cylinder 34 in accordance with on/off brake control signal (BCS) commands from the ABS controller 28 when the latter determines, during braking, that a skid condition exists based upon the measured wheel speed ω as will be described in more detail below. In this first embodiment, the reduction in applied hydraulic pressure corresponding to the BCS is either none (zero), whereby the full hydraulic pressure from the master cylinder 28 is applied to the wheel cylinder 34 and results in the maximum possible applied brake torque $T_a$, denoted as $T_{a-max}$, or the commanded reduction is full (total), whereby no pressure is transmitted to the wheel cylinder 34 and applied brake torque $T_a$ is reduced to zero.

As understood from the above discussion, the actuator 32 simply serves as an on/off switch on maximum braking apart from any actuator dynamics, which may be assumed to include wheel cylinder dynamics that limit brake application and release from being instantaneous. To better understand the wheel cylinder and actuator dynamics, consider the wheel cylinder as behaving like an electronic capacitor with a small but finite time for charging the cylinder with hydraulic fluid and another small but finite time for discharging (dumping) the hydraulic fluid when the ABS is active. Other constraints on actuator response include hysteresis effects when switching between brake application and release, time delays in opening the hydraulic valves, dead zone effects at low brake cylinder pressures, and brake torque fade effects.

Equally importantly, the basic electro-hydraulic transfer function between electric current input and fluid pressure output from the hydraulic actuator 32 must be included in the design of any SMO-based ABS system or subsequent computer simulation. Similar considerations hold if an electro-mechanical brake actuator is substituted for the hydraulic actuator 32 for the case of an electric brake where the brake torque is developed by an electric motor. The use of an electric brake instead of a hydraulic brake is shown in a subsequent embodiment described herein.

Furthermore, the discrete, on/off brake command signal from the digital SMO controller 28 must usually be converted into an electrical signal of some sort, hereafter called the actuator control current, to control either a hydraulic valve or an electric motor in the actuator 32. Depending on the nature of the actuator, the discrete brake command signal may simply become directly transformed into a binary-valued actuator control current (i.e., on or off current), or it may be converted to a continuous-valued, i.e. analog, actuator control current via low pass filtering. The output signal amplitude of the low pass filter may be, for example, proportional to the duty cycle of the binary-valued brake command signal. Filtering of the brake command signal to obtain an analog actuator control current is desirable to obtain a final electrical signal that is compatible with the dynamics of many types of actuators such as the hydraulic actuators used in most modern jet transport aircraft. Without loss of generality, we shall assume that the generation of a discrete or analog actuator control current from the discrete on/off brake command signal takes place within the brake actuator 28 using methods well known to those skilled in the art of electronic control systems. The figures therefore shall not show the typically required components of a digital to analog converter, low pass filter and possible other phase and amplitude compensation circuits necessary to obtain either a binary or a continuous/analog actuator control current from the discrete brake command signal.

We shall further assume all these brake actuator dynamics and physical constraints do not change the basic validity of controlling ABS braking based on estimates of differential wheel torque $\Delta\hat{T}$ provided by the SMO 10 to the ABS controller 28. However, we note that such effects and constraints must be properly modeled in any computer simulation models to assess the expected performance of an SMO-based ABS in an actual implementation.

To reiterate, the hydraulic actuator 32 is regulated by the on/off brake command signal from the ABS controller 28. The ABS controller 28 receives as inputs the differential wheel torque estimate $\Delta\hat{T}$ from the SMO 10, and (usually) the wheel-angular speed ω itself as measured by the wheel speed sensor 26. Recall that the SMO 10 and controller 28 of FIGS. 3–7 are assumed here to be implemented as part of a digital computer or programmable controller. Analog to digital converters (not shown) must convert the wheel speed sensor and/or other sensor inputs, if analog, into suitable digital signals. Similarly many actuators require an analog control current for proper operation not a digital, i.e. binary, on/off signal as shown in FIGS. 3–7. In the latter case a digital to analog converter and associated analog conditioning circuitry are assume included in the actuator 32. The design of such converters and signal conditioning circuitry is well known to those skilled in the art of electronic signal processing.

In this first preferred embodiment of the invention, the ABS controller 28 generates a binary valued on/off actuator control signal or commanded based upon an algebraic comparison of the estimate, of differential wheel torque $\Delta\hat{T}$ and a threshold differential wheel torque $\Delta T_{threshold}$ that is typically a negative number, representing a net wheel deceleration, but not too negative as that would indicate a deceleration level which could provoke a deep skid. The actuator control command logic is given by:

$$\Delta\hat{T}<\Delta T_{threshold} \Rightarrow \text{actuator off} \quad (6)$$

$$\Delta\hat{T}\geq\Delta T_{threshold} \Rightarrow \text{actuator on} \quad (7)$$

The actuator on/off commands are usually associated with two corresponding command electric currents, $I_{off}$ and $I_{on}$, provided to the electro-hydraulic actuator control valve. In this case the off-command is a current level $I_{off}$ that switches the actuator 32 fully off, and the on-command is a current level $I_{on}$ that switches the actuator 32 fully on.

In this first preferred embodiment and most of the other embodiments unless specifically noted, the threshold differential wheel torque $\Delta T_{threshold}$ is continuously updated as a function of a so called "skid signal" SS and of the previously computed threshold differential wheel torque $\Delta T_{threshold}$. This skid signal SS is computed by the controller 28 using wheel speed measurement $\omega$, and the threshold differential wheel torque $\Delta T_{threshold}$ is computed from the skid signal SS by the controller 28 as described further below. Without loss of generality, the skid signal SS can be generated in controller 28 as a dimensionless scalar between 0 and 1 similar to instantaneous wheel slip S, with 0 representing no skidding and 1 representing total or locked wheel, skidding. The skid signal SS can be generated in many ways as described further below. Clearly, the skid signal SS is closely related to wheel slip but need not actually numerically equal the value of the instantaneous wheel slip S. In fact, it is desirable that the skid signal SS slightly overestimate the degree of over-slip (i.e., SS>SS>S*) when an over-slip is present and slightly underestimate the degree of under-slip (i.e., SS<S<S*) when an under-slip is present as discussed further below.

It is possible to simply establish a fixed threshold differential wheel torque $\Delta T_{threshold}$ by trial and error during extensive SMO-based ABS computer simulation optimized for the vehicle in question with an assumed nominal weight and nominal ground surface condition. For example, a value of −170 ft-lbs was frequently employed as a fixed threshold differential wheel torque $\Delta T_{threshold}$ in MATLAB®/SIMULINK™ computer simulations of an SMO-based ABS for a Boeing 737-100 aircraft, and adequate braking performance was obtained using that value. In those simulations, the ABS controller 28 made no use of the measured wheel speed $\omega$ shown in FIG. 3 to generate the skid signal SS because a continuously computed skid signal SS is required only for a dynamically adjusted threshold differential wheel torque $\Delta T_{threshold}$. (The inventors used a simplified Boeing 737-100 aircraft model for their simulation with only a single braked wheel representing the four braked wheels actually present, with any differences in wheel slip S between the wheels ignored.)

There are many possible strategies for dynamically computing the threshold differential wheel torque $\Delta T_{threshold}$ in order to improve braking performance. ABS Braking performance is typically measured by comparing the distance to a dead stop from a candidate ABS to the distance to a dead stop obtained under an ideal condition of the maximum wheel drag torque $T_b$ being achieved at all times. A reasonable approach is to start out at the nominal threshold differential wheel torque $\Delta T_{threshold}$ mentioned above and to periodically, every millisecond or less, compute a skid signal SS based upon the measured wheel angular speed $\omega$. Thereafter, the threshold differential wheel torque $\Delta T_{threshold}$ is increased algebraically (favoring releasing the brakes) if the skid signal SS exceeds suitable "high" value, $SS_{high1}$. Similarly, the threshold differential wheel torque $\Delta T_{threshold}$ is decreased algebraically (favoring reapplying the brakes) if the skid signal SS is below a suitable "low" value. A range of skid signal set point values, $SS_{high2}$ and $SS_{low2}$ with $SS_{high2}>SS_{high1}$ and $SS_{low2}<SS_{low1}$ can also be defined. The threshold differential wheel torque $\Delta T_{threshold}$ is incrementally increased in magnitude as the skid signal SS exceeds these set point values and is incrementally decreased in magnitude as the skid signal SS falls below these set point values. The actual increments or decrements are relatively small and are determined via computer simulation and are stored in a look-up-table in the controller 28.

Figure 1A:
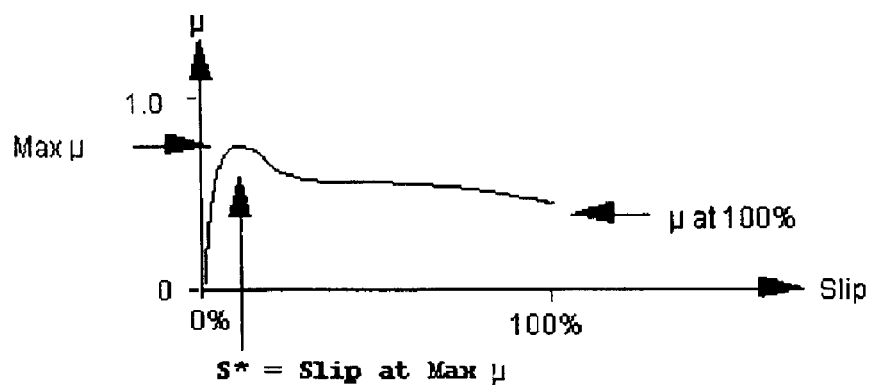
FIG. 1A is a plot of a typical $\mu$-S curve for a given ground surface condition.

It is important to emphasize that when the wheel-speed computed skid signal SS equals the target skid signal SS*, this does not imply that the instantaneous slip S equals the optimal slip S*. The optimal slip S* is, of course, unknown. Rather, it is only necessary that when SS is near SS*, the instantaneous slip S is also reasonably close to S*. Then, the instantaneous slip S will periodically pass through the optimal slip S* under SMO controlled ABS operation. Because the peak in instantaneous slip S at optimal slip S* is reasonably broad (see FIG. 1A), SMO-based ABS performance, while still slightly sub-optimal, will be more than adequate for most vehicle braking applications.

The above-described discrete process of adjusting the skid signal threshold increments could be further and further subdivided until the threshold increments are essentially a continuous function of the skid signal SS with increasingly positive threshold values (favoring brake release) as the skid signal SS becomes greater than the target skid signal SS* and increasingly negative threshold values (favoring brake application) as it becomes smaller than the target skid signal SS*. Additional logic could also be included to drive the threshold differential wheel torque $\Delta T_{threshold}$ back to its initial nominal value if the skid signal SS is sufficiently close to the target skid signal SS* for a specified amount of time.

A technique that proved very effective in the computer simulations of aircraft braking was to apply light braking only for the first 0.5–1.0 second after an initial brakes free roll at gear tough down. The free roll is typically in the 1–3 second range and is intended to allow the wheels to spin up to match the aircraft's longitudinal velocity as well as avoid having the nose wheel smashed down on the runway due to premature braking. The light braking control strategy might correspond to using the fixed threshold of −170 ft-lbs mentioned above for the Boeing 737-100 example. It was found possible to generate a lookup table in the controller of set point values $\{SS_{low2}, SS_{low1}, SS^*, SS_{high}1, SS_{high2}\}$ in terms of a minimum skid signal SS (SS__min__cal) observed during the short, light braking, ABS calibration period once a limit cycle was established in the skid signal history. Other lookup table entry parameters, e.g., aircraft landing weight, would, of course, be added in any practical implementation of this automatic set-point calibration technique. In this way, compensation for different landing runway conditions (dry, snow, wet, ice, etc.) could be automatically achieved, and the requirement that when the instantaneous skid signal is near the target skid signal SS* then instantaneous slip S is reasonably close to the optimal slip S* could be automatically satisfied. This same scheme for initial calibration of the set points used for dynamically adjusting the threshold differential wheel torque $\Delta T_{threshold}$ can also be applied to braking of land vehicles.

It is necessary to generate the skid signal SS continuously in order to update the corresponding threshold differential wheel torque $\Delta T_{threshold}$. There are numerous ways to dynamically compute a suitable skid signal SS employing measurements of wheel angular speed $\omega$. However, the key to maximal success in making any wheel-speed-only ABS work properly (not just the SMO-based ABS of our invention) is to insure that if instantaneous slip S is less than optimal slip S*, then the skid signal SS is less than the target skid signal SS*, and if the instantaneous slip S is greater than the optimal slip S* then the skid signal SS is greater than the target skid signal SS*. In other words, as the ABS controller 28 issues on/off brake commands in an attempt to drive SS towards SS*, it will simultaneously be driving the instantaneous slip S towards its optimal value S* even if the optimal value S* is not known exactly.

If optimal slip S* truly varied over the entire range of 0–1 (with slip expressed as a decimal rather than a percentage), this calculation of the skid signal SS would be an impossible requirement unless S* were exactly known in advance or were estimated dynamically as in the above-referenced Rudd patent with its complicated mathematical set of 8 coupled state variable differential equations to solve simultaneously. Fortunately, for all practical paved ground surfaces of interest, including dry, wet, snow and ice covered ground surfaces, the optimal slip is almost always in the range 0.1 to 0.2 and typically around 0.13–0.15. It is the corresponding value of ground surface friction coefficient $\mu$ at the optimal slip S* that varies dramatically dependent on the ground surface condition, but whatever the ground surface condition, the friction coefficient $\mu$ peaks when instantaneous slip S equals S*. Furthermore, the peak in friction coefficient $\mu$ is usually a broad peak with only minimal loss in braking efficiency as the limits of 0.1 and 0.2 are approached. Thus, setting the target skid signal SS* to 0.13–0.15, while not essential, removes any large offsets between the values of the skid signal SS and instantaneous slip S. This convenient choice of target skid signal SS* means that to the extent the instantaneous skid signal SS is really a good approximation to the instantaneous slip S (at least when both are in the range of 0.1–0.2), the controller 28 will actually be controlling the instantaneous slip S to its optimal value S* during each ABS braking limit cycle. Without loss of generally, we shall assume a choice of SS* in the range 0.13–0.15 in the remainder of this discussion.

Performance may suffer slightly from an average under-slip or over-slip condition over the ABS braking cycles during the entire braking period to the extent that the target skid signal SS* differs from the optimal slip S* and to the extent that the instantaneous skid signal SS differs from the instantaneous slip S. However, this performance degradation typically amounts to only a few percent reduction in total distance to a dead stop compared to braking having exact knowledge of S* and with actual slip right at S* for the entire braking distance. This observation was confirmed in the extensive computer simulations we performed on braking a jet transport with the SMO based ABS system of this first embodiment. The simulations showed that the instantaneous wheel slip S simply oscillated up and down over a modest range that included optimal wheel slip S*, with S* roughly centered in this range Once the SMO and threshold differential torque computation logic was properly "tuned" for the jet transport. Thus, our computer simulations showed that SMO-based ABS braking oscillated about the peak of the $\mu$-S curve.

Figure 1B:
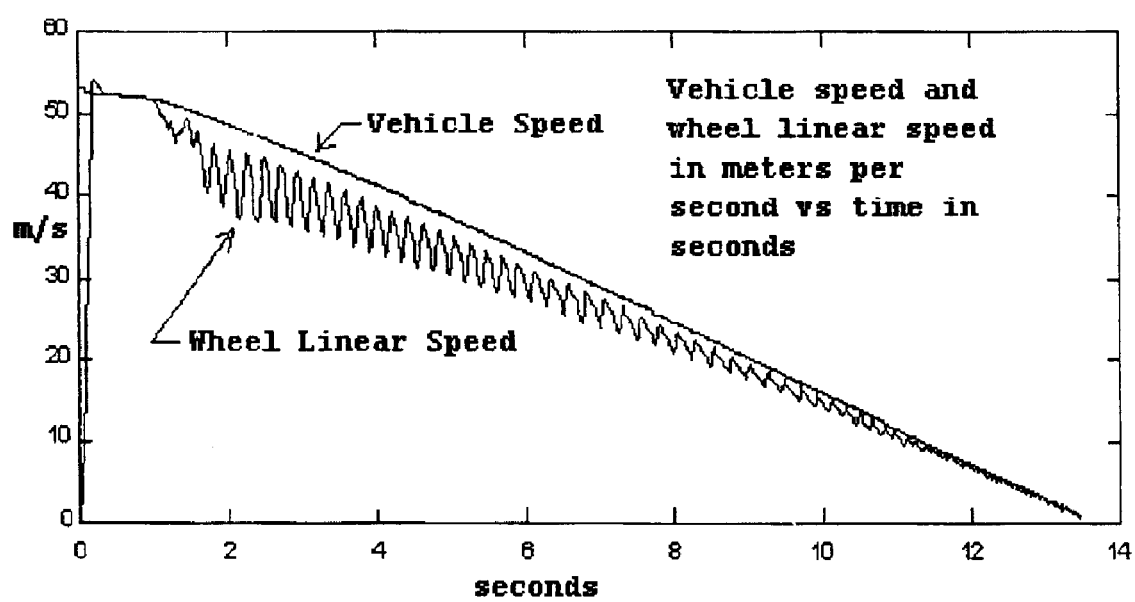
FIG. 1B is a plot of typical vehicle wheel linear speed (wheel angular speed ω multiplied by wheel radius r) and vehicle linear velocity vs. time for a computer simulated transport aircraft braking run under ABS control showing the expected oscillation in wheel speed.

One way to develop a suitable skid signal SS during ABS operation would be to extract wheel slip S related information directly from the observed relative peaks and, possibly in some cases relative valleys, in the measured, wheel speed $\omega$ in relation to a smoothed or heavily filtered version of the measured wheel speed $\omega$ over a suitable long moving time window. (We shall avoid using the adjacent "sliding" commonly used by those skilled in the art of signal processing in describing the above moving time window to avoid any erroneous connection of this time window with a sliding mode observer or sliding mode theory.) Referring to FIG. 1B, it shows typical wheel linear velocity and vehicle velocity (both in meters per second) from an aircraft braking computer simulation employing an SMO-based ABS similar to that described in this first embodiment. The wheel linear velocity (vehicle wheel angular speed $\omega$ multiplied by wheel radius r) is an oscillating function that decreases in amplitude over time, and the vehicle linear velocity is a linearly decreasing function that decreases over the time from initial wheel touchdown to a dead stop on the runway. The vehicle linear velocity is not normally available to the SMO-based ABS of our invention, but it was, of course, computed in the computer simulations. In FIG. 1B, braking is not applied for the first second of landing roll and only light braking is applied for the next 0.8 seconds. Full SMO controlled ABS begins at about 2 seconds.

Each peak in the measured wheel speed $\omega$ occurs at a relative minimum in instantaneous slip S and each valley in the measured wheel speeds $\omega$ occurs at a relative maximum in instantaneous slip S. The wheel linear velocity depicted in FIG. 1B exhibits these peaks and valleys in the measured wheel speed $\omega$ since wheel linear velocity equals $\omega$*r. Consider next how these peaks in measured wheel speed $\omega$ averaged over a suitably chosen moving time window can be used. Each measured peak wheel speed $\omega_{peak}$ (it can be assumed any additional subscript denoting "measured" is unnecessary due to the accuracy of the wheel angular speed sensor) is associated in the SMO-based ABS software algorithm with a minimal nominal slip, SS_min_nom, usually somewhat larger than the minimum slip value anticipated under efficient ABS braking for the vehicle in question. A corresponding instantaneous value for vehicle velocity V at this time can be obtained by inverting equation (1) and assuming that true slip S is the same as SS_min_nom when wheel angular speed equals $\omega_{peak}$. The result is $$V = \omega_{peak} * r/(1 - SS\_min\_nom) \qquad (8)$$

This same value of vehicle velocity V could be used over the next wheel angular speed cycle (refer to the corresponding plot for wheel linear speed in FIG. 1B) to compute the instantaneous skid signal SS given the measured wheel angular speed $\omega$ since vehicle velocity V decreases only relatively slowly in the usual fraction of a second such cycles occupy. The corresponding instantaneous skid signal SS would be determined by:

$$SS = [\omega_{peak} - (1 - SS\_min\_nom) * \omega]/\omega_{peak} \qquad (9)$$

where the wheel radius r cancels out of the numerator and denominator.

However, our extensive computer simulations have shown that some wheel angular speed cycles may have peaks corresponding to instantaneous slips greater than SS_min_nom and some to slips less than SS_min_nom. In this case, an unfiltered skid signal SS derived by equation (9) would fluctuate more than desired over short periods of time and this would tend to destabilize the control logic for the threshold on differential brake torque $\Delta T_{threshold}$. Thus, rather than use a single peak value for determining the instantaneous skid signal SS during the extensive computer simulation for an aircraft SMO-based ABS, we found it beneficial to smooth or filter the measured peak wheel angular speeds stored in computer memory by simply averaging the peaks in a moving time window encompassing the last 10 to 100 or so relative peaks in the measured wheel angular speed. Alternately, digital low pass filters can be employed to perform the same smoothing function with good results in the simulations. Or, the maximum of all the wheel angular speed peaks observed in the sliding window could be employed in equation (9) if the proper choice of SS_min_nom were made.

The corresponding computation of the skid signal SS based on an averaging of the peak wheel speed $\omega_{peak}$ over a suitable moving time window or smoothing the measured peaks in a digital low pass filter then becomes:

$$SS=[<\omega_{peak}>-(1-SS\_min\_nom)*\omega]/<\omega_{peak}> \qquad (10)$$

where the <> denotes a filtering or moving time window smoothing operation and again the wheel radius r cancels out of the numerator and denominator.

Strictly speaking, equation (10) is most valid only when the measured wheel speed $\omega$ is "near" to $<\omega_{peak}>$ as determined, for example, by verifying that $\omega$ is greater than or equal to the corresponding SMO state variable estimate for wheel angular speed $\omega$. However, the extensive SMO-based ABS simulation work conducted by the inventors has led us to believe that "near" usually extends to all measured angular speeds including right down to the minimum (valleys) themselves provided the SMO-based ABS is working satisfactorily. In the simulations, satisfactory operation was usually indicated if the value of the skid signal SS was below some limit characteristic of a deep skid regardless of surface condition, e.g., SS=0.25–0.30.

A logical choice for SS_min_nom would be SS_min_nom=0 at the start of ABS braking. Braking may be assumed to start at time t=0 for a surface vehicle but not until t=1 to 3 seconds for a transport aircraft, the delay enabling the aircraft wheels to spin up to match the ground velocity and to prevent the nose wheel from being slammed onto the runway. Furthermore, the surface vehicle or aircraft velocity is known from the speedometer or inertial/air-data instrumentation, respectively, at the onset of ABS operation. Thus, the known vehicle velocity can be used instead of the initially measured wheel angular speed to generate a skid signal SS near the start of braking via equation (1) assuming that the instantaneous skid signal SS is scaled to be close numerically to the instantaneous slip S. In this case, the computed skid signal SS value will always agree with instantaneous wheel slips S very accurately for the first second or two of ABS operation.

After a short time (1–2 seconds in the aircraft braking simulations) the computation of skid signal SS via equation (10) based on the observed peaks in measured wheel speed $\omega$ must transition to using an SS_min_nom greater than zero and usually just slightly larger than the expected minimal wheel slip S after "steady state" ABS operation is reached. A typical value might be SS_min_nom=0.06 in the aircraft braking simulations. An alternate value for SS_min_nom might be SS_min_cal, the minimum observed during the initial short ABS calibration interval featuring light braking, if this calibration technique is employed to generate a set of skid signal set points as previously discussed. Extensive computer simulation for the jet transport braking application showed some improvements in braking performance could also be obtained by reducing SS_min_nom by up to 50% as the measured wheel angular speed decreased from its initial value to zero during the braking run. These techniques are all part of "tuning" the SMO-based ABS for a particular application. In general, it was found that increasing SS_min_nom tended to make the braking more conservative (less braking) while decreasing SS_min_nom tended to make the braking less conservative (more braking).

A similar algorithm for computing a skid signal SS based on the minimum measured wheel speed $\omega_{valley}$ can be employed in the event the above peak wheel speed based formula for deriving the skid signal SS is not universally applicable for a particular vehicle. Again, an average or filtered version of the observed minimum wheel speed $\omega_{valley}$ as measured by the wheel speed sensor is calculated and stored in the computer memory ever a suitable moving time window. This filtered minimum wheel speed mathematically as $<\omega_{valley}>$ consistently with the above described development of a skid signal SS based on measured peak wheel speeds. This computation is most valid whenever the measured peak wheel angular speed $\omega$ is "near" to $<\omega_{valley}>$ as determined, for example, by simply verifying that measured wheel angular speed $\omega$ is less than or equal to the estimated wheel angular speed $\omega$ state variable. The skid signal SS computation, valid when the measured wheel speed W is "near" $<\omega_{valley}>$, then becomes:

$$SS=[<\omega_{valley}>-(1-SS\_max\_nom)*\omega]/<\omega_{valley}> \qquad (11)$$

The value of SS_max_nom must be obtained by extensive computer simulation for the intended vehicle application. A safe initial choice for SS_max_nom would be a value slightly larger than the maximum expected instantaneous wheel slip S, e.g., 0.25 to 0.30 in the case of transport aircraft braking.

Numerous additional variations of the above-described ways of calculating the skid signal SS, computing the threshold differential wheel torque $\Delta T_{threshold}$, and implementing the on/off actuator control command logic described above exist that will be apparent to those skilled in the art.

Figure 4:
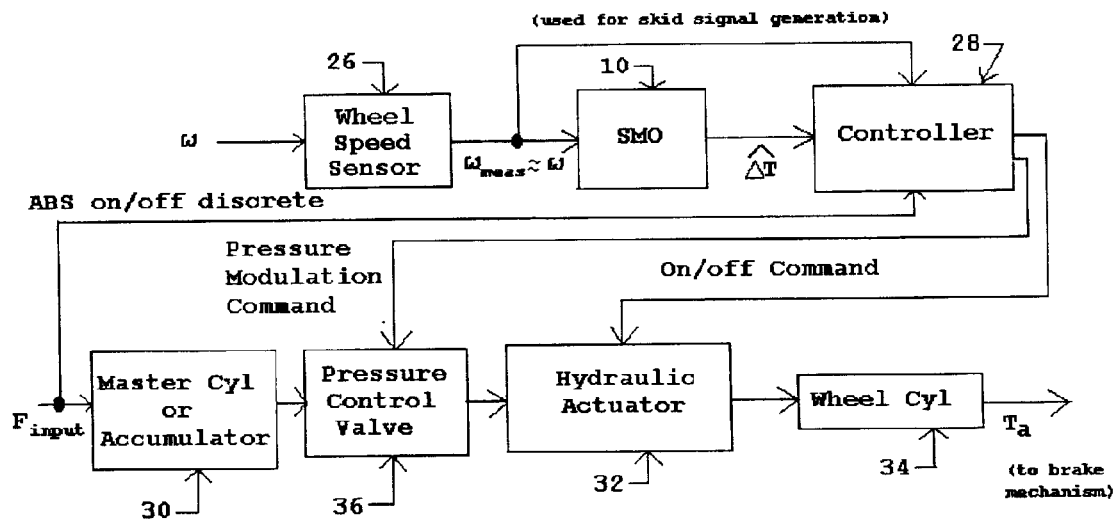
FIG. 4 is a system block diagram of a second preferred embodiment of an SMO-based ABS of the invention as in FIG. 3 but incorporating brake pressure modulation of a hydraulic brake by the on/off ABS brake controller.

Second Preferred Embodiment: A second preferred embodiment of the present invention is depicted in FIG. 4 that is similar to the first embodiment of FIG. 3 except that a pressure control valve 36 is inserted between the master cylinder or accumulator 30 and the hydraulic on/off actuator 32. Braking is accomplished hydraulically and only wheel speed measurements $\omega$ are input to the SMO 10. The SMO 10 and ABS controller 28 operates in the same manner as described above to produce the on/off commands applied to the hydraulic on/off actuator 32 when ABS is active.

The pressure control valve 36 effectively reduces or modulates the maximum pressure available from the master cylinder 30 to a value that is compatible with the physical constraints (time constants, hysteresis, time delays, dead zones, etc.) affecting the actuator's on/off response. A pressure modulation command is derived from the skid signal SS determined as described above and applied to the pressure control valve 36 to modulate the available brake pressure provided from the master cylinder 30. Modulation of the available brake pressure via the pressure control valve 36 reduces undershoots and overshoots in the instantaneous slip S occurring around optimal slip S* that could otherwise occur.

Whenever ABS operation is not active, the full pressure available from the master cylinder 30 is transferred to the wheel cylinder 34. Normal braking occurs when the vehicle operator (pilot or driver) depresses the brake pedal and directly varies the braking pressure output via an additional manual pressure-metering valve. The manual pressure-metering valve is not explicitly shown in the hydraulic ABS systems of FIGS. 3, 4 or 7 but may be assumed to be integrated with the master cylinder 30 and directly controls the output pressure from the master cylinder when the ABS is not active. When the ABS is active, the manual pressure valve is overridden by the ABS although, of course, the operator pedal deflection corresponding to the input force $F_{input}$ is typically used to initiate ABS action. Furthermore, it is assumed that the pressure control valve 36 has electronic control means so that a suitably scaled pressure modulation command signal applied to it can uniformly decrease the available hydraulic pressure to the wheel cylinder 34 from the maximum master cylinder pressure down to zero. Reduction of maximum master cylinder pressure is often desirable whenever commanded brake pressure from the pilot/driver is excessive for optimal braking on relatively low μ braking situations (e.g., snow/ice on runway/road).

When ABS is active under the conditions described above, the ABS controller 28 develops the on/off commands following the logic of the above equations (6) and (7) to switch the applied braking torque on and off as described above. The estimate of differential wheel torque $\Delta\hat{T}$ is developed as described above with respect to the first embodiment. The value of the threshold differential wheel torque $\Delta T_{threshold}$ is continuously computed as a function of the wheel angular speed derived skid signal SS and the previous value of the threshold differential wheel torque $\Delta T_{threshold}$ in the same ways as described above with respect to the first embodiment.

However, in the present embodiment, the maximum possible brake torque, $T_{a-max}$, developed when the actuator 32 is in the "on" state and applied to the wheel cylinder 34 is proportional to the pressure output from the pressure control valve 36 which in turn depends upon the pressure modulation command. This pressure output from the pressure control valve 36 is thus less than or equal to the maximum pressure available from the master cylinder 30.

The ABS controller 28 develops the pressure modulation command from the currently computed instantaneous skid signal SS. A simple pressure modulation algorithm frequently assumed by the inventors in simulating an SMO-based ABS for aircraft involved leaving the available pressure from the pressure control valve 36 at its maximum value as long as SS≦SS*+0.03, the available pressure to the wheel cylinder was then assumed, in the computer simulation, to be decreased exponentially with an exponential decay constant of 0.02 (dimensionless units) in terms of increments of the skid signal SS. Applying the above pressure modulation typically resulted in reducing the maximum available brake torque from 60,000 ft-lbs (total for 4 braked wheels) at SS=0.17 to 8120 ft lbs at SS=0.21 in the transport aircraft braking simulation described herein.

Figure 5:
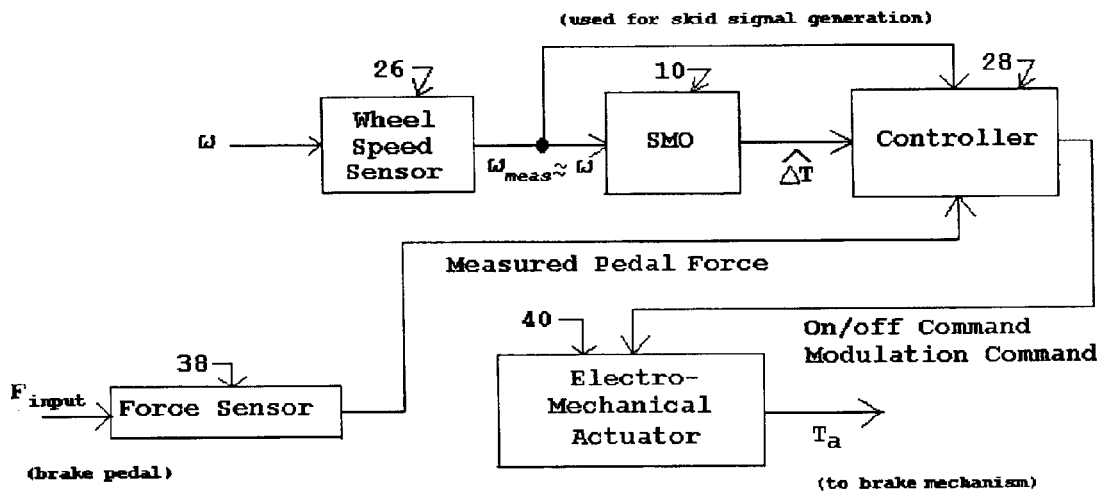
FIG. 5 is a system block diagram of a third preferred embodiment of an SMO-based ABS of the present invention using the SMO of FIG. 2 but additionally employing a measurement of applied brake pedal force to generate on/off commands in an ABS brake controller based on comparison of the estimated differential wheel torque $\Delta T$ to a calculated threshold differential wheel torque $\Delta T$ and applying the on/off commands from an ABS brake controller to an electro-mechanical brake actuator.

Third Preferred Embodiment: A third preferred embodiment of the present SMO-based ABS of the present invention is depicted in FIG. 5, wherein the brake mechanism incorporates an electro-mechanical actuator 40 instead of the hydraulic actuator 32 of the first and second embodiment. Such an electro-mechanical actuator 40 typically consists of an electric motor that moves the brake pad or caliper assembly into contact with the brake disk rotor stack and thereby applies an applied brake force, $F_a$, and brake torque $T_a$ to decrease the wheel angular velocity or wheel speed ω.

In this embodiment, the brake pedal force $F_{input}$ is measured by a sensor 38, typically some form of strain gauge. When the ABS is not active, the measured pedal force $F_{input}$ alone is used to generate a target braking command in the ABS controller 28. The ABS controller 28 therefore ignores the wheel speed measurement ω and the estimate of differential wheel torque $\Delta T$ shown in FIG. 5. The ABS controller 28 simply generates the target braking command (not shown) that the electro-mechanical actuator 40 receives and responds to by developing the applied brake force $F_a$ that results in an applied torque $T_a$ to the wheel proportional to the brake pedal force, $F_{input}$. This concept is also commonly called "brake by wire".

Typically, the ABS functions are activated through operation of ABS controller 28 when the measured brake pedal force via force sensor 38 approaches a saturation level (i.e., "hard braking"). The estimate of differential wheel torque $\Delta\hat{T}$ is developed by SMO 10, and the value of the threshold differential wheel torque $\Delta T_{threshold}$ is continuously computed by ABS controller 28 as a function of the wheel speed derived skid signal SS and the previous value of the threshold differential wheel torque $\Delta T_{threshold}$ in the same way as described above with respect to the first embodiment. Control of the electro-mechanical actuator 40 is then based on the SMO output estimate of differential wheel torque according to the following rules:

$$\Delta\hat{T} < \Delta T_{threshold} \Rightarrow T_a = 0 \qquad (12)$$

$$\Delta\hat{T} \geq \Delta T_{threshold} \Rightarrow T_a = T_{a\text{-}max} \qquad (13)$$

where $T_{a-max}$ is the maximum electro-mechanical brake torque available. $T_a=0$ would usually be associated with a corresponding off-command electric current $I_{off}$, and $T_a=T_{a-max}$ would usually be associated with a corresponding on-command electric current $I_{on}$ that are applied to the electro-mechanical actuator control valve of the actuator 32. The current level $I_{off}$ switches the actuator 32 fully off, and the current level $I_{on}$ switches the actuator 32 fully on.

The electro-mechanical brake torque $T_a$ can be a fixed value, $T_{a-max}$, corresponding to the maximum allowed brake motor current or it can be a modulated value anywhere between 0 and $T_{a-max}$ as in the second embodiment described above. The modulation of electro-mechanical brake torque $T_a$ can be accomplished at the electro-mechanical brake by allowing for intermediate command states for brake motor current to be issued by the ABS controller 28. For example, in the jet transport simulation, the maximum possible servomotor current and hence maximum applied brake torque $T_{a-max}$ can remain constant as long as the skid signal SS exceeds 0.17. The maximum applied brake torque $T_{a-max}$ can then be reduced toward zero in a linear manner, reaching zero, say, when the skid signal SS equals 0.25.

Figure 6:
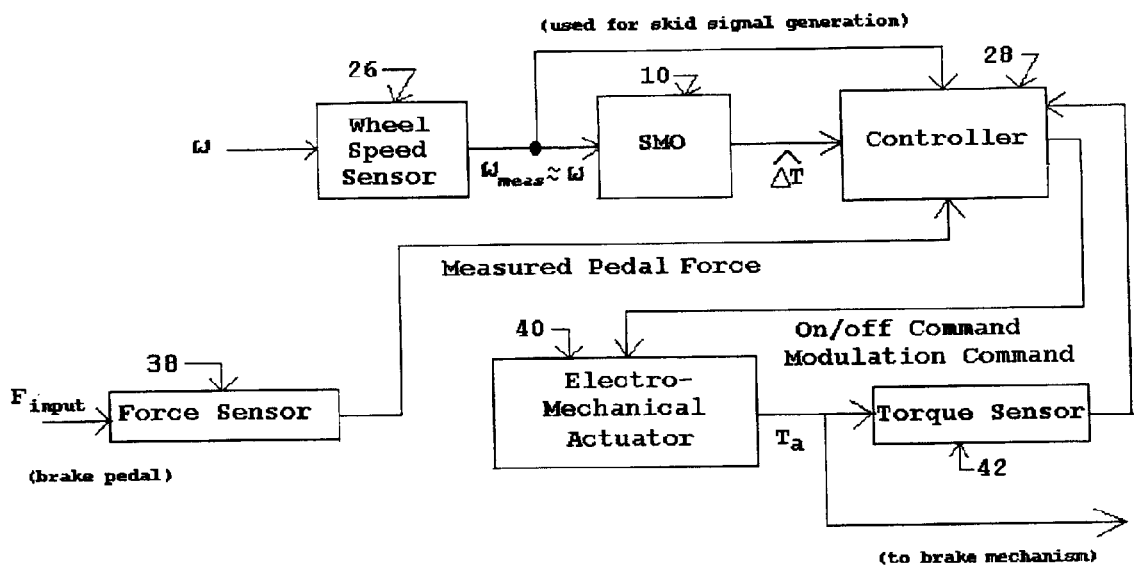
FIG. 6 is a system block diagram of a fourth preferred embodiment of an SMO-based ABS of the present invention as in FIG. 5 but incorporating a direct measurement of brake torque inputted to the ABS brake controller.

Fourth Preferred Embodiment: A fourth preferred embodiment of the present SMO-based ABS system is depicted in FIG. 6. A difference between this embodiment and the third preferred embodiment illustrated in FIG. 5 is the addition of an applied brake torque sensor 42 which accurately measures applied brake torque $T_a$ and inputs this measurement to the ABS controller 28. The estimate of differential wheel torque $\Delta\hat{T}$ is developed by SMO 10, and the value of the threshold differential wheel torque $\Delta T_{threshold}$ is continuously computed by ABS controller 28 as a function of the wheel speed derived skid signal SS and the previous value of the threshold differential wheel torque $\Delta T_{threshold}$ in the same ways as depicted above. The measured applied brake torque $T_a$ enables inclusion of several controller strategies/algorithms that are intended to further improve braking performance.

In one strategy based upon the additional availability of an accurate brake torque sensor 42, a skid signal SS need not be computed at all by the ABS controller 28. Instead, the estimate of differential wheel torque $\Delta\hat{T}$ is continuously summed with the measured applied brake torque $T_a$ resulting directly in a drag torque estimate, $\hat{T}_b$, of the road/tire braking or drag torque $T_b$. The ABS controller 28 then develops on/off commands that are applied to the electro-mechanical brake actuator 40 to operate it in a manner so as to maintain the drag torque estimate $\hat{T}_b$ near its maximum value, preferably as long as the brakes are applied. ABS operation right at the true maximum of the $\mu$-S curve, i.e., operation at instantaneous slip S=optimal slip S*, should be achieved when the drag torque estimate $\hat{T}_b$ is maintained at its maximum value in this way. This should improve ABS performance over that attainable without a measurement of applied brake torque $T_a$.

This embodiment employing the torque sensor 42 can be implemented in any of the described embodiments of the invention using either a hydraulic or an electro-mechanical actuator.

Fifth Preferred Embodiment: All of the above-described embodiments can be implemented in land vehicles and in aircraft. This embodiment, however, is intended for aircraft only. As noted earlier, gear walk oscillations of the landing gear adversely influence antilock braking of aircraft wheels. The gear walk effect is due to the fact the landing gear of most aircraft act like springs in the longitudinal direction (fore-aft direction) as well as in the vertical (up-down) direction. All of the above embodiments can be modified to take such oscillations into account for aircraft usage, and one example of a modification of the first embodiment depicted in FIG. 3 is set fourth in FIG. 7. The modification involves the inclusion of a fore-aft accelerometer 44 that is mounted at the end of the wheel strut supporting the wheel or set of wheels and develops an accelerometer output signal that is filtered through a high pass filter 46 and applied to the ABS controller 28 in addition to the wheel speed $\omega$ and the estimate of differential wheel torque $\Delta\hat{T}$ For an aircraft landing gear in which the wheel/brake assembly is attached to the end of a relatively long and flexible strut, the negative slope region of the $\mu$-S curve (e.g., the region with S>S* in FIG. 1A) can produce a non-linear fore-aft gear displacement oscillation relative to the main body of the aircraft called gear walk. Runway/tire friction forces on the landing gear increase as brakes are applied and decrease as brakes are released during ABS on/off cycling. The frequencies of these forces can contain components at or near the natural fore-aft resonance frequencies of the landing gear causing the gear walk oscillations to grow in amplitude, possibly resulting in structural damage to the aircraft. Even if no damage occurs, the apparent skid signal SS as computed based on measurements of wheel angular speed $\omega$ by ABS controller 28 will then usually cycle the brake threshold at frequencies too high for efficient ABS operation. It is highly desirable therefore to suppress or damp such gear walk oscillation components to relatively low levels in the ABS controller 28.

The magnitude and frequency of the output signal from the fore-aft accelerometer 44 provides a measure of the gear walk longitudinal oscillations. The accelerometer output signal is passed through the high pass filter 46 to eliminate the background acceleration signal (normally negative) resulting from the braking operation on the aircraft as a whole. This background acceleration signal should be much slower in variation (contain much lower frequency spectra) than the gear walk acceleration components also present in the output signal of fore-aft accelerometer 44. Additional electronic compensation may also be added to the resultant filtered accelerometer output signal to provide the necessary gain and phase margin for stable braking. The need for such compensation is well known to those skilled in the art of electronic signal processing and said compensation may be assumed integrated into the high pass filter 46.

Typically, gear walk frequencies are in the 15–25 Hz range for jet transport aircraft while the desired braking deceleration has frequency components under 10 Hz. In fact one method used to detect the presence of gear walk and the need for its compensation in the ABS braking controller is to continuously monitor a short term average of the ABS cycling period between successive brake applications. When the period shortens (usually quite suddenly), there is a need for compensation of the ABS control on/off command sent to the brake actuator 32.

Figure 7:
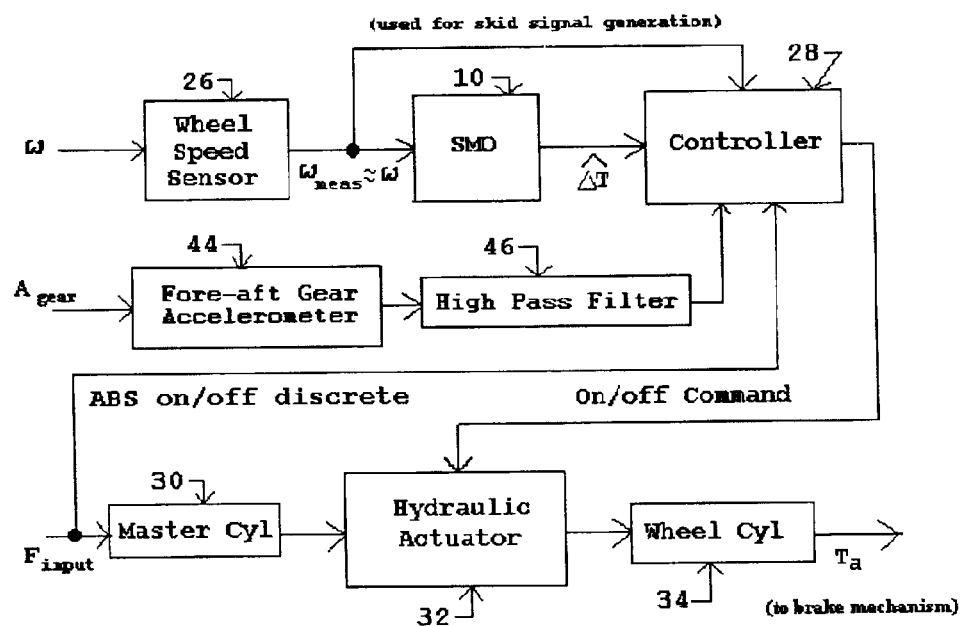
FIG. 7 is a system block diagram of a fifth preferred embodiment of an SMO-based ABS of the present invention as in FIG. 3 but incorporating a fore-aft accelerometer and high pass filter to minimize the effects of landing gear walk oscillations on SMO based antilock braking of an aircraft.

In the case of an hydraulic brake actuator 32, the electrical current operating the actuator 32 is controlled by the on/off command issued by the controller 28 in FIG. 7. The actuator command may be on/off, but the actuator operating current cannot change instantaneously. Instead it increases asymptotically to a maximum or decays asymptotically to zero, corresponding to brakes on or off commands, with some finite time constant, e.g., 0.01 to 0.05 seconds. The actuator 32 responds to the electric current and opens or closes an internal valve, which, in turn, controls the hydraulic pressure and drives the wheel cylinder 34 to apply or release the brakes. The actual transfer function for actuator valve pressure out vs. actuator current is usually quite complicated but can be modeled mathematically for inclusion in computer simulations in ways known in the art. The gear walk oscillation amplitude can be sufficiently damped to allow normal SMO-based ABS operation to continue in the manner described in reference to the first embodiment by properly summing a suitably phased and scaled version of the high pass filtered fore-aft accelerometer signal, after conversion to an equivalent gear walk oscillation damping current, with the normal electrical current operating the actuator 32 and controlled by the on/off command. The above assumed known mathematical model for the brake actuator's current to pressure transfer function is also required for determining the correct phase and amplitude of the gear walk oscillation damping current. This damping current, once generated, is then simply added to the normal brake actuator current set by the on/off commands from the ABS controller 28.

The validity of this approach to gear walk compensation for aircraft braking applications has been established in numerous jet transport aircraft SMO-based ABS computer simulations performed by the inventors. Finally, it should be noted the same gear walk compensation scheme can be added to any of the other preferred embodiments, not just the first embodiment which assumed a hydraulic actuator.

All patents and publications referenced herein are incorporated herein by reference in their entireties.

Although the invention has been described in detail with particular reference to a preferred embodiment and alternate embodiments thereof, it will be understood variations and modifications can be effected within the scope of the following claims. Such modifications may include substituting elements or components, which perform substantially the same function in substantially the same way to achieve substantially the same result for those described herein. The disclosed embodiments are presented for purposes of illustration and not limitation, and the present invention is limited only by the claims that follow.

We claim:

1. An improved method for optimizing wheel slip of a land or aircraft vehicle with respect to a ground surface to maximize braking performance of a wheel-mounted tire against a ground surface during application of the wheel brake by an operator of the vehicle comprising:

measuring wheel angular speed;

processing the measured wheel angular speed in a sliding mode observer to calculate an estimated differential wheel torque, wherein said differential wheel torque represents the difference between wheel drag torque, generated at the interface of the tire and the ground surface, and applied braking torque;

generating a threshold differential wheel torque from measured wheel angular speed;

generating a braking control signal from comparison of the estimated differential wheel torque and the threshold differential wheel torque; and applying the braking control signal to a brake actuator as an applied braking torque so as to optimize wheel slip during braking.

2. The method of claim 1, wherein the brake actuator is responsive to an off-command braking control signal by interrupting the application of the wheel brake by the vehicle operator and is responsive to an on-command braking control signal by not interrupting the application of the wheel brake by the vehicle operator, and wherein:

the step of generating the braking control signal comprises generating an off-command braking control signal whenever the generated differential wheel torque is less than the threshold differential wheel torque and an on-command braking control signal whenever the generated differential torque is greater than the threshold differential wheel torque.

3. The method of claim 2, wherein the applying step comprises converting the braking control signal into a scaled analog actuator control current by low pass filtering to smooth the on-command braking control signal and the off-commands braking control signal such that the applied braking torque generated by the actuator to alter the wheel slips is, or rapidly approaches, zero whenever the braking control signal exhibits the off-command and is, or rapidly approaches, a non-zero value whenever the braking control signal exhibits the on-command.

4. The method of claim 3, wherein the braking actuator is one of an electro-mechanical brake actuator and an hydraulic brake actuator.

5. The method of claim 2, wherein the braking actuator is one of an electro-mechanical brake actuator and an hydraulic brake actuator.

6. The method of claim 2, wherein the brake actuator comprises one of a electro-mechanical and an hydraulic brake actuator and further comprising:

measuring the force of application of the wheel brake by the operator and developing a force signal in response; and limiting the maximum brake torque available to be applied to the wheel by the brake actuator in proportion to the measured force so that full operator applied force is required to generate maximum available brake torque when the braking control signal exhibits the on-command.

7. The method of claim 1, wherein the step of generating a threshold differential wheel torque comprises selecting a fixed threshold differential wheel torque appropriate to the vehicle.

8. The method of claim 1, wherein the step of generating a variable threshold differential wheel torque comprises:

generating a skid signal from the measured wheel angular speed that is at zero in the absence of wheel slip and is at a numeric value proportional to wheel slip when wheel slip occurs;

determining whether the skid signal is increasing, signifying increasing wheel slip, and increasing the threshold differential wheel torque favoring reduced braking in response thereto; and determining whether the skid signal is decreasing, signifying decreasing wheel slip, and decreasing the threshold differential wheel torque favoring increased braking in response thereto.

9. The method of claim 8, wherein the measured wheel angular speed varies between maximum and minimum wheel angular speeds exhibiting speed amplitude peaks and valleys with intermittent changes in wheel slip, and the step of generating a skid signal comprises:

defining a moving time window;

detecting a plurality of the peaks and/or the valleys of the wheel angular speed over the moving time window;

determining a smoothed version of the maximum wheel angular speed from the plurality of peaks via averaging or filtering and/or determining a smoothed version of the minimum wheel angular speed from the plurality of valleys via averaging or filtering;

deriving a reference vehicle velocity from knowing that the smoothed maximum wheel angular speed must be associated with a minimal value of instantaneous slip and/or the smoothed minimum wheel angular speed must be associated with a maximal value of instantaneous wheel slip; and deriving the skid signal from the derived reference vehicle velocity and the measured wheel angular speed proportional to the instantaneous wheel slip.

10. The method of claim 8, further comprising providing a lookup table of adjustments to the threshold differential wheel torque, the look-up table using the current value of the differential wheel torque threshold and the determined skid signal.

11. The method of claim 1, wherein the step of generating a braking control signal comprises:

generating an off-command braking control signal that commands the brake actuator to interrupt application of the brake to the wheel when the estimated differential wheel torque falls below the threshold differential wheel torque; and generating an on-command braking control signal that does not command the actuator to interrupt application of the brake to the wheel when the estimated differential wheel torque exceeds the threshold differential wheel torque.

12. The method of claim 11, wherein:

the wheel brake comprises one of a master cylinder and an accumulator that develops a hydraulic pressure during application of the wheel brake by the vehicle operator that is applied to the brake actuator that responds by applying braking-force to the wheel in proportion to hydraulic pressure; and the brake actuator incorporates a pressure regulator that allows the actuator to regulate the maximum hydraulic pressure to the brake cylinder to any intermediate value between zero and the maximum available from the master cylinder or accumulator; and further comprising the steps of:

generating a pressure modulation control signal for driving the pressure regulator valve so as to vary the maximum available hydraulic pressure that can be applied to the brake actuator; and applying the braking pressure modulation control signal to the pressure regulator to modulate the hydraulic pressure applied to the wheel when the brake control signal exhibits the on-command, the maximum available hydraulic pressure in turn determining the maximum applied brake torque.

13. The method of claim 11, wherein the wheel brake actuator comprises an electro-mechanical actuator that applies braking force directly to the wheel in proportion to an electrical current input to the wheel brake actuator during application of the wheel brake by the vehicle operator, and further comprising the steps of:

generating a current modulation control signal to vary the maximum available electrical current that can be input to the brake actuator, the maximum available electrical current determining the maximum applied brake torque; and applying the braking current modulation signal to the electro-mechanical actuator to modulate the maximum brake torque applied to the wheel when the braking control signal exhibits the on-command.

14. The method of claim 1, wherein the vehicle is an aircraft, and the wheel and tire are mounted to a strut that exhibits fore-aft gear walk acceleration while the tire is in contact with the ground surface, and further comprising:

measuring fore-aft acceleration of the strut and providing an acceleration signal;

processing the acceleration signal to develop a gear walk suppression signal; and combining the gear walk suppression signal with the braking control signal to achieve both antilock brake function as well as gear walk suppression.

15. A system for optimizing wheel slip of a land or aircraft vehicle with respect to a ground surface to maximize braking performance of a wheel-mounted tire against a ground surface during application of the wheel brake by an operator of the vehicle comprising:

means for measuring wheel angular speed;

means for processing the measured wheel angular speed in a sliding mode observer to calculate an estimated differential wheel torque, wherein said differential wheel torque represents the difference between wheel drag torque, generated at the interface of the tire and the ground surface, and applied braking torque;

means for generating a threshold differential wheel torque from measured wheel angular speed;

means for generating a braking control signal from comparison of the estimated differential wheel torque and the threshold differential wheel torque; and means for applying the braking control signal to a brake actuator as an applied braking torque so as to optimize wheel slip during braking.

16. The system of claim 15, wherein the brake actuator is responsive to an off-command braking control signal by interrupting the application of the wheel-brake by the vehicle operator and is responsive to an on-command braking control signal by not-interrupting the application of the wheel brake by the vehicle operator, and wherein:

the means for generating the braking control signal comprises means for generating an off-command braking control signal whenever the generated differential wheel torque is less than the threshold differential wheel torque and an on-command braking control signal whenever the generated differential torque is greater than the threshold differential wheel torque.

17. The system of claim 16 wherein the applying means comprises means for converting the brake control signal into a scaled analog actuator control current by low pass filtering to smooth the on-commands and off-commands of the braking control signal such that the applied braking torque generated by the actuator to alter the wheel slip is, or rapidly approaches, zero whenever the braking control signal exhibits the off-command and is, or rapidly approaches, a non-zero value whenever the braking control signal exhibits the on-command.

18. The system of claim 17, wherein the braking actuator is one of an electro-mechanical brake actuator and an hydraulic brake actuator.

19. The system of claim 17, wherein the braking actuator is one of an electro-mechanical brake actuator and an hydraulic brake actuator.

20. The system of claim 16, wherein the brake actuator comprises one of a electro-mechanical and an hydraulic brake actuator and further comprises:

means for measuring the force of application of the wheel brake by the operator and developing a force signal in response; and means for limiting the maximum brake torque available to be applied to the wheel by the brake actuator in proportion to the measurement force so that full operator applied force is required to generate maximum available brake torque when the braking control signal exhibits the on-command.

21. The system of claim 15, wherein the means for generating a threshold differential wheel torque comprises selecting a fixed threshold differential wheel torque appropriate to the vehicle.

22. The system of claim 15, wherein the means for generating a variable threshold differential wheel torque comprises:

means for generating a skid signal from the measured wheel angular speed that is at zero in the absence of wheel slip and is at a humeric value proportional to wheel slip when wheel slip occurs;

means for determining whether the skid signal is increasing, signifying increasing wheel slip, and increasing the threshold differential wheel torque favoring reduced braking in response thereof; and means for determining whether the skid signal is decreasing, signifying decreasing wheel slip, and decreasing the threshold differential wheel torque favoring increased braking in response thereto.

23. The system of claim 22, wherein the measured wheel angular speed varies between maximum and minimum wheel angular speeds exhibiting speed amplitude peaks and valleys with intermittent changes in wheel slip, and the means for generating a skid signal comprises:

means for detecting a plurality of the peaks and/or the valleys of the wheel angular speed over a moving time window;

means for determining a smoothed version of the maximum wheel angular speed from the plurality of peaks via averaging or filtering and/or determining a smoothed version of the minimum wheel angular speed from the plurality of valleys via averaging or filtering;

means for deriving a reference vehicle velocity from knowing that the smoothed maximum wheel angular speed must be associated with a minimal value of instantaneous slip and/or the smoothed minimum wheel angular speed must be associated with a maximal value of instantaneous wheel slip; and means for deriving the skid signal from the derived reference vehicle velocity and the measured wheel angular speed proportional to the instantaneous wheel slip.

24. The method of claim 28, further comprising a lookup table of adjustments to the threshold differential wheel torque, the look-up table using the current value of the differential wheel torque threshold and the determined skid signal.

25. The system of claim 15, wherein the means for generating a braking control signal comprises:

means for generating a braking control signal off-command that commands the brake actuator to interrupt application of the brake to the wheel when the estimated differential wheel torque falls below the threshold differential wheel torque; and means for generating a braking control signal on-command that does not command the actuator to interrupt application of the brake to the wheel when the estimated differential wheel torque exceeds the threshold differential wheel torque.

26. The system of claim 15, wherein:

the wheel brake comprises one of a master cylinder and an accumulator that develops a hydraulic pressure during application of the wheel brake by the vehicle operator that is applied to the brake actuator that responds by applying braking force to the wheel in proportion to hydraulic pressure; and the brake actuator incorporates a pressure regulator that allows the actuator to regulate the maximum hydraulic pressure to the brake cylinder to any intermediate value between zero and the maximum available from the master cylinder or accumulator; and further comprising:

means for generating a pressure modulation control signal for driving the pressure regulator valve so as to vary the maximum available hydraulic pressure that can be applied to the brake actuator; and means for applying the braking pressure modulation control signal to the pressure regulator to modulate the hydraulic pressure applied to the wheel when the brake control signal exhibits the on-command, the maximum available hydraulic pressure in turn determining the maximum applied brake torque.

27. The system of claim 15, wherein the wheel brake actuator comprises an electro-mechanical actuator that applies braking force directly to the wheel in proportion to an electrical current input to the wheel brake actuator during application of the wheel brake by the vehicle operator, and further comprising:

means for generating a current modulation control signal to vary the maximum available electrical current that can be input to the brake actuator, the maximum available electrical current determining the maximum applied brake torque; and means for applying the braking current modulation signal to the electro-mechanical actuator to modulate the maximum brake torque applied to the wheel when the braking control signal exhibits the on-command.

28. The system of claim 15, wherein the vehicle is an aircraft, and the wheel and tire are mounted to a strut that exhibits fore-aft gear walk acceleration while the tire is in contact with the ground surface, and further comprising:

means for measuring fore-aft acceleration of the strut and providing an acceleration signal;

means for processing the acceleration signal to develop a gear walk suppression signal; and means for combining the gear walk suppression signal with the braking control signal to achieve both antilock brake function as well as gear walk suppression.

* * * * *